June 8, 1965  S. A. SLENKER  3,188,605
SPRING CLIP FASTENER
Filed Dec. 6, 1960  3 Sheets-Sheet 1

INVENTOR.
STEPHEN A. SLENKER
BY E. M. Squire
ATTORNEY

June 8, 1965  S. A. SLENKER  3,188,605
SPRING CLIP FASTENER
Filed Dec. 6, 1960  3 Sheets-Sheet 2

INVENTOR.
STEPHEN A. SLENKER
BY E. M. Squire
ATTORNEY

June 8, 1965   S. A. SLENKER   3,188,605
SPRING CLIP FASTENER
Filed Dec. 6, 1960   3 Sheets-Sheet 3

INVENTOR.
STEPHEN A. SLENKER
BY E. M. Squire
ATTORNEY

United States Patent Office 3,188,605
Patented June 8, 1965

3,188,605
SPRING CLIP FASTENER
Stephen A. Slenker, 363 Concord Road, Billerica, Mass.
Filed Dec. 6, 1960, Ser. No. 75,058
7 Claims. (Cl. 339—213)

The present application is a continuation-in-part of my copending application Serial No. 825,951, now abandoned, filed on July 9, 1959.

The present invention relates to electrical clip fasteners which are useful in making temporary connections for testing or similar purposes.

A principal object of the invention is the provision of simple and extremely compact test clip or fastener which may be readily applied to and removed from the terminals of miniature circuit components which are presently in general use.

A further object of the invention is the provision of a test clip of this character formed of a single continuous length of springy electrically conductive strip material, the ends of the strip being shaped to form jaw members which are integrally formed extensions of the ends of the strip. The jaw members are adapted for gripping a conductor or terminal of a piece of electrical apparatus.

Still another object of the invention is to reduce the overall dimensions of the test clip by folding, coiling or otherwise effectively shortening the continuous strip intermediate its ends while preserving the actual undiminished length of the strip for purposes of springiness and gripping pressure of the jaws.

Another object of the invention is the provision of a test clip or connector wherein the jaws are shaped to permit the clip to be applied or removed without manually applying special pressure to separate the jaws, the jaws being forced apart by sliding or wedging engagement with the terminal or conductor.

Briefly, the test clip in accordance with the invention comprises a continuous flat strip of springy electrically conductive material, the ends of the strip being shaped to form gripping jaws for engagement with a conductor or electrical terminal. Intermediate its ends, the strip is folded, coiled, formed into an undulatory configuration, or otherwise compacted so that the overall dimensional requirements of the clip are reduced without reducing the actual length of the continuous strip.

Various additional objects, features and advantages of the invention will become apparent upon reading the following specification together with the accompanying drawing forming a part hereof.

Referring to the drawing.

Figure 1:
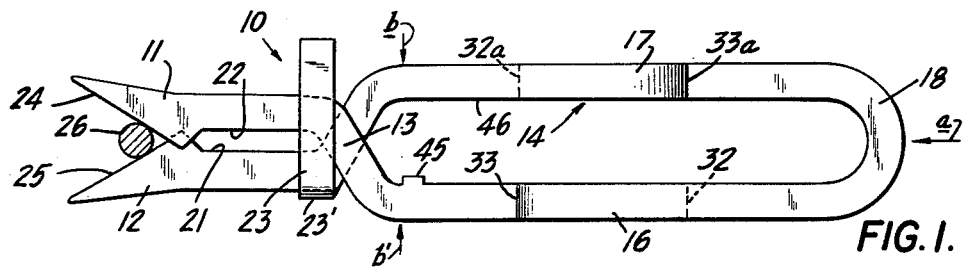
FIGURE 1 is a plan view of an embodiment of the invention wherein the clip is compacted by folds located intermediate the end of the continuous strip, the jaws being shaped to permit engagement and disengagement of the clip by wedging action without additionally exerting manual pressure for separation of the jaws, the clip being shown about to engage a conductor.

Referring now to FIGURE 1, a connector clip made in accordance with the present invention is designated generally at 10, and is formed from a resilient unitary metallic strip having opposite surfaces that define the length and width of the strip. Clip 10 comprises a body portion 14 that includes a pair of spring lever arms 16 and 17, one end of each of which is connected by a U-shaped bight portion 18 so that the lever arms are superposed one above the other; and a jaw portion that includes jaw members 11 and 12, each of which is connected to the end of the lever arms opposite to the end connected to bight portion 18.

As indicated, bight portion 18 is U-shaped and defines a plane that is parallel to the opposite surfaces of the portion of the metallic strip that constitutes the bight portion. Jaw member 11 overlies jaw member 12 so that the jaw members are disposed in side-by-side, crossing relationship at 13 for scissors-type opening and closing action. Consequently, the opposite surfaces of the portion of the metallic strip that constitutes each of the jaw members are substantially parallel to the plane defined by bight portion 18. Of significance is the fact that the jaw members, the spring lever arms and the bight portion are all integrally formed from a single piece of metal.

Preferably, the clip connector is formed of springy sheet material of good electrical conductivity such as Phosphor bronze or beryllium copper. The jaw members 11 and 12 are provided with substantially keen opposing edges 21 and 22. To prevent the jaw members from moving away from each other laterally, the jaw member 12 has an integrally formed guide leg 23 which extends over the jaw member 11 in proximity to the cross-over area 13. The leg 23 is bent at 23' and prevents separation of the jaw members in the cross-over area 13. The guide leg 23 may yieldingly urge the jaw members into sliding lateral engagement with each other in the cross-over area 13.

Figure 2:
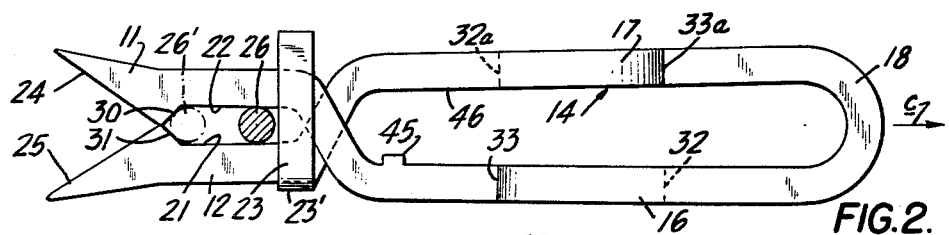
FIGURE 2 shows the clip of FIG. 1 after engagement with the conductor.

The outer free ends of the jaw members 11 and 12 are provided with confronting sloping surfaces 24 and 25, respectively, which permit the clip to be connected with a conductor 26 by exerting force longitudinally of the clip in the direction indicated by the arrow *a* in FIG. 1. This spreads the jaw members 11 and 12 apart against the yielding action of the spring lever arms 16 and 17 so that the conductor 26 is received and gripped between the cooperating edges 21 and 22 as shown in FIG. 2. Alternatively, the clip may be opened to receive the conductor 26 by manually applying pressure simultaneously to the legs 16 and 17 in the directions indicated by the arrows *b, b'* in FIG. 1. This may conveniently be accomplished by use of the thumb and forefinger.

To prevent opening of the jaws to such an extent that the jaw member 11 may escape from the guiding action of the leg 23 of jaw member 12, the jaw member 11 has a stop member 45 integrally formed thereon which is engageable with the jaw member 12 to limit the maximum opening of the jaws.

Inwardly of the sloping surfaces 24 and 25, the jaw members 11 and 12 are formed with short confronting sloping edges 30 and 31, respectively, which permit the clip to release the conductor 26 by pulling in the direction opposite to the direction of arrow *a* of FIG. 1, namely in the direction of the arrow *c* in FIG. 2. The configuration of the sloping edges 30 and 31 is such that a deliberate and relatively strong pull is required to release the conductor 26, the amount of pull being such that the conductor 26 will not be accidentally released under normal conditions of service.

One of the most important features of the present invention resides in the manner in which the spring lever arms are formed. Basically, each of the lever arms is undulated to provide a plurality of folds, the edge of the portion of the metallic strip that constitutes a lever arm defining a lever arm plane that is perpendicular to the plane defined by the bight portion. As shown in the drawing, the opposite surfaces of the portion of the strip that constitutes a lever arm are perpendicular to the lever arm plane.

Figure 3:
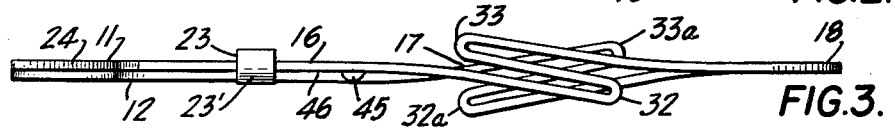
FIGURE 3 is a side elevational view of the clip of FIGS. 1 and 2, the conductor being omitted.

In the embodiment of the invention illustrated in FIGS. 1, 2 and 3, the clip is dimensionally compacted by folds or U-bends 32, 33 in the spring lever arm 16 and similar folds or U-bends 32a, 33a in the spring lever arm 17 which constitute an S-shaped multiple bend. In this manner, from a standpoint of space requirements, the effective lengths of the spring lever arms 16 and 17 are much shorter than their actual lengths, the resiliency of the arms 16 and 17 being determined by their actual lengths.

Figure 2A:
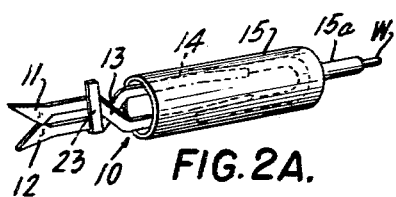
FIGURE 2A is a perspective view of the clip of FIGS. 1 and 2, the conductor being omitted, and with the body portion of the clip enclosed in a flexible insulating sleeve.

In FIG. 2A, the body portion 14 of the clip of FIGS. 1 to 3 is shown enclosed in a flexible sleeve 15 of insulating material. Enclosure in the sleeve 15 will prevent electrical shock when manipulating the clip and will also prevent short-circuiting among adjacent clips which may be simultaneously attached to a piece of apparatus under test. The jaw members 11 and 12 protrude beyond the open end of the sleeve 15. A test lead W is connected to the bight 18 of the clip 10. Adjacent to the bight 18, the test lead W is enclosed in a neck portion or extension 15a of the sleeve 15 which is of reduced diameter.

Figure 4:
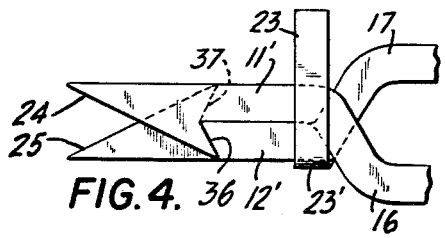
FIGURE 4 is a fragmentary plan view showing a modified form of jaw construction for the clip of FIGS. 1, 2 and 3 wherein the conductor may not be disengaged without the application of manual pressure for separating the jaws.
Figure 5:
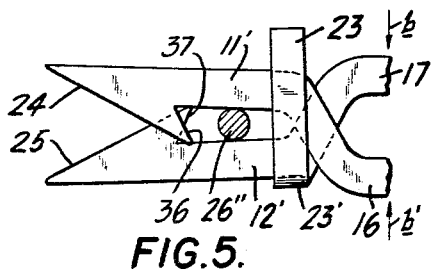
FIGURE 5 is similar to FIG. 4, a conductor being shown engaged between the jaws.

In the modification of FIGS. 4 and 5, the harpoon shape of the jaws 11 and 12 is such that the conductor 26″ is positively locked in engagement with the clip, the clip being otherwise the same as the clip of FIGS. 1 to 3. The direction of inclination of the edges 36 and 37 is opposite to that of the edges 30, 31 in FIG. 2 so that a hooking action is obtained. The conductor may be inserted between the jaw members 11 and 12 as described above by virtue of the wedging action of the sloping end surfaces 24 and 25. The internal surfaces 36 and 37 are so sloped, however, that a hooking action is obtained so that the conductor 26″ may be released only by the application of manual pressure in the directions of the arrows *b, b'* of FIG. 1.

Figure 6B:
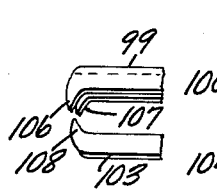
FIGURE 6B is a fragmentary elevational view showing a modified shape for the free ends of the jaws of the clip of FIG. 6.
Figure 6:
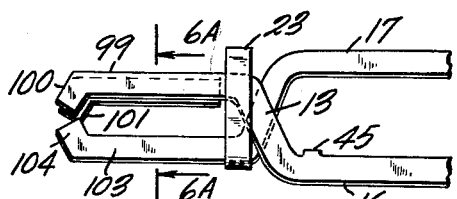
FIGURE 6 is a fragmentary elevational view showing a modified form of jaw construction which is particularly suited for use with printed circuits.
Figure 6A:
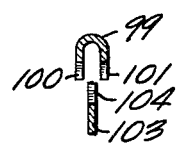
FIGURE 6A is a transverse sectional view taken along the line 6A—6A of FIG. 6, looking in the direction of the arrows.

FIG. 6 shows a modified form of jaw construction as applied to the clip of FIG. 1. The upper jaw member 99 is of U-shaped transverse cross-sectional configuration and terminates at its free end in depending spaced parallel pointed contact members 100 and 101. The lower jaw member 103 terminates in a single pointed contact member 104. The lower pointed contact member 104 is slidable between the two upper pointed contact members 100 and 101. As in FIG. 1, a conductor may be gripped between the jaw members. However, the pointed contact members may be applied to a flat plate such as a printed circuit for establishing contact with a desired portion of the printed circuit. Since the force of the lower pointed contact member 104, when applied to a flat plate, is exerted midway between the two upper pointed contact members 100 and 101, the clip is inherently stable and will not tend to tilt or cant.

In FIG. 6, the points of the contact members 100, 101 and 104 are located somewhat inwardly of the outer ends of the jaw members 99 and 103. If desired, the contact members may be modified in shape as shown in FIG. 6B. In FIG. 6B, the points of the upper contact members 106 and 107 and the lower contact member 108 are located at the extreme outer ends of the jaw members 99 and 103.

Figure 7:
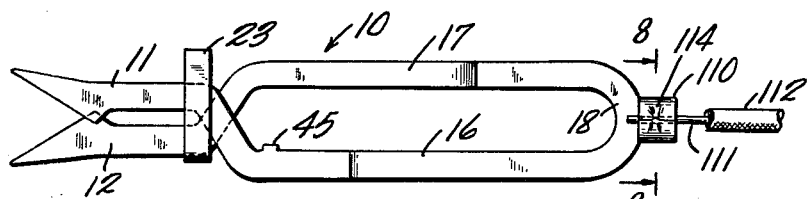
FIGURE 7 is an elevational view of a clip similar to the clip of FIG. 1 showing a crimped sleeve for securing a conductor to the clip.
Figure 8:
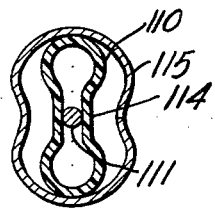
FIGURE 8 is a sectional view taken along the line 8—8 of FIG. 7.

FIGS. 7 and 8 illustrate means for connecting a test lead to the clip of FIG. 1. A tubular member 110 of deformable metal is suitably secured to the bight 18 of the clip 10. The bare conductor 111 of a test lead 112 is inserted in the tubular member 110 and the tubular member is crimped as indicated at 114. An insulating sleeve 115 may be applied over the tubular member 110 as shown in FIG. 8, the sleeve 115 being omitted from FIG. 7 for better illustration of the tubular member 110.

Figure 9:
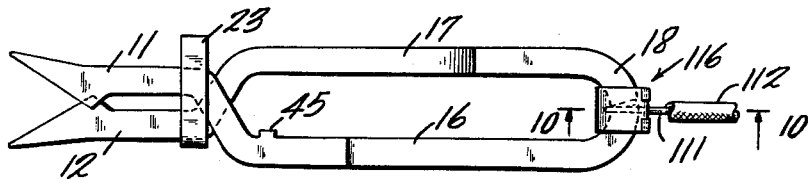
FIGURE 9 shows a clip similar to the clip of FIG. 1 having a supplemental clip for holding a bent conductor in engagement with the closed end of the clip.
Figure 10:
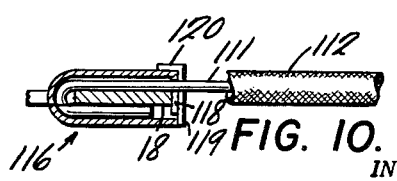
FIGURE 10 is a sectional view taken along the line 10—10 of FIG. 9.

FIGS. 9 and 10 show another arrangement for securing a test lead to the bight 18 of clip 10. The bare conductor 111 of the test lead 112 is bent with a U-shaped bend around the bight 18 as may best be seen in FIG. 10. A U-shaped clip designated generally 116 is then applied to the bight 18 so that it extends over the bare conductor 111 and holds the conductor 111 securely in good electrical contact with the bight 18. The U-shaped clip 116 comprises spaced inner leg portions 118 which straddle the conductor 111 and spaced outer leg portions 119 which also straddle the conductor 111. The outer leg portions 119 terminate in locking tabs 120 which prevent opening of the U-shaped clip 116.

Figure 11:
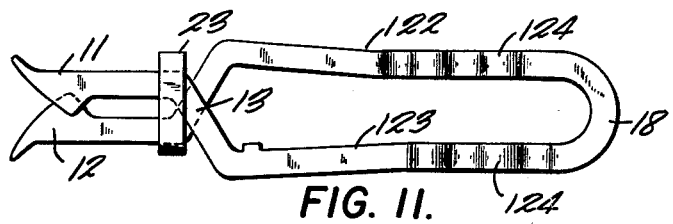
FIGURE 11 is an elevational view showing a modified form of clip having undulatory bends in its legs for increasing the resiliency of the clip.

FIG. 11 illustrates a modification of the arrangement of FIG. 1. In FIG. 1, the length of the clip 10 is shortened from the standpoint of space requirements by folding over the central portions of the spring legs by means of U-shaped bends, there being three thicknesses of flat strip spring material between the two bends in each leg. In the modification of FIG. 11, each spring leg 122 and 123 is formed with undulations 124 in its central portion between the cross-over area 13 and the bight 18. The undulations 124 extend symmetrically on either side of a plane passing through the cross-over area 13 and the bight 18. The undulations are formed by U-shaped bends of greater radius than the U-shaped bends 32, 33, 32a, 33a in FIG. 1. In the modification of FIG. 11, the overall thickness of the test clip is increased with respect to FIG. 1. Displacement of the jaw members 11 and 12 produces a resilient torsional stressing of the flat strip in the undulations 124 instead of an edgewise bending stress as in the spring arms 16 and 17 of FIG. 1.

Figure 12:
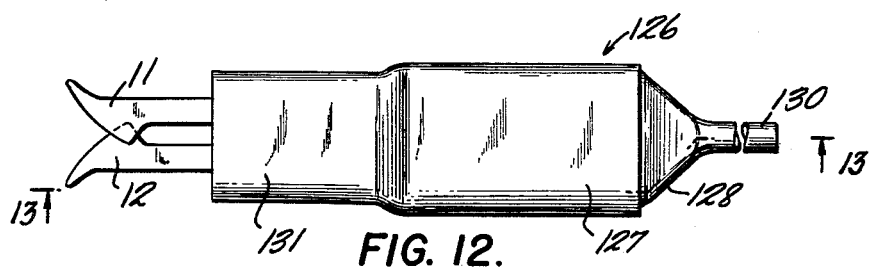
FIGURE 12 shows the clip of FIG. 11 partially enclosed in a flexible insulating sleeve.
Figure 13:
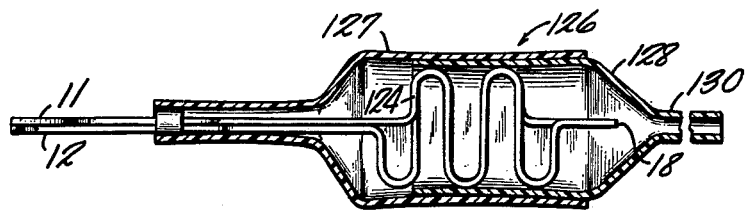
FIGURE 13 is a sectional view taken along the line 13—13 of FIG. 12, looking in the direction of the arrows.

FIGS. 12 and 13 show the clip of FIG. 11 enclosed in a two-piece cover of flexible insulating material. The cover, which is designated generally as 126, comprises an outer front portion 127 which cooperates with an inner rear portion. The outer portion 127 partially overlies the inner portion 128 after assembly. The inner portion 128 is constricted to form a neck 130 for the enclosure of a test lead such as the lead W shown in FIG. 2A. The outer portion 128 is provided with a flattened front end 131 which is wide enough to permit opening of the jaw members 11, 12 but too thin to pass over the undulations 124.

Figure 14:
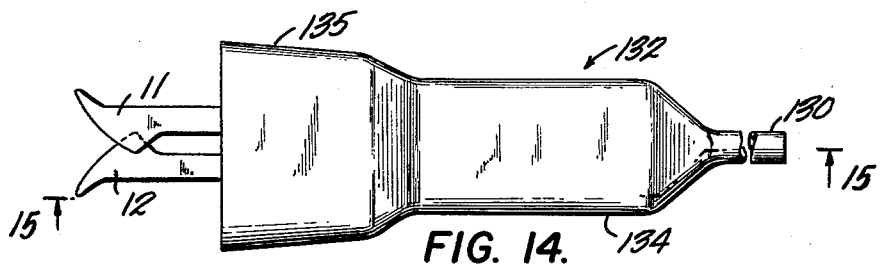
FIGURE 14 shows a clip similar to the clip of FIG. 11 provided with a modified form of insulating sleeve.
Figure 15:
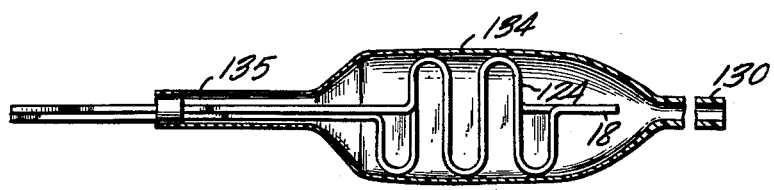
FIGURE 15 is a sectional view taken along the line 15—15 of FIG. 14, looking in the direction of the arrows.

In FIGS. 14 and 15, there is shown a one-piece cover, designated generally as 132, for the clip of FIG. 11. The cover 132 is formed of flexible insulating material and comprises a rear restricted neck portion 130 in the same manner as the cover shown in FIGS. 12 and 13. The central portion 134 fits over the undulations 124. The front portion 135 is both widened and flattened with respect to the central portion 134. However, the front portion 135 has substantially the same transverse cross-sectional perimeter as the central portion 134. In order to apply the one-piece cover 132 to the clip of FIG. 11, the front portion 135 may be temproarily flexed to render it narrower and thicker. In this flexed condition it may be passed over the undulations 124. After passage over the undulations 124, it is then released whereupon it will assume its normal shape as shown in FIGS. 14 and 15.

While I have shown what I believe to be the best embodiments of my invention, it will be apparent to those skilled in the art that various changes may be made therein without departing from the spirit and scope of the invention as defined in the appended claims.

What is claimed is:

1. A spring clip fastener consisting of a single piece of metal sheet, having substantially greater width than thickness, said fastener being composed of a first jaw portion at one end thereof, a substantially rigid lever arm portion adjacent to said first jaw portion, a flexible undulated spring portion adjacent to said lever arm portion and a second lever arm portion adjacent to said spring portion, said lever arm and spring portions having surfaces which project edgewise on to a plane perpendicular to said width, being connected by a spring leg to a second jaw portion which has its surfaces principally along the same plane as the first jaw portion, the last-mentioned plane defining a plane of motion of said spring portion and said lever arms, said first-mentioned plane being perpendicular to the plane of motion of said spring portion and said lever arm portions.

2. A spring clip fastener consisting of a single piece of metal sheet, having substantially greater width than thickness, said fastener being composed of a first jaw portion at one end thereof, a substantially rigid lever arm portion adjacent to said first jaw portion, a flexible undulated spring portion adjacent to said lever arm portion and a second lever arm portion adjacent to said spring portion, said lever arm and spring portions having surfaces which project edgewise on to a plane perpendicular to said width, said second lever arm portion being connected by a spring leg to a second jaw portion which has its surfaces principally along the same plane as the first jaw portion, the last-mentioned plane defining a plane of motion of said spring portion and said lever arms, said first-mentioned plane being perpendicular to the plane of motion of said spring portion and said lever arm portions, and a restraining member which limits the motion of said spring means to the desired plane.

3. A spring clip fastener consisting of a single piece of metal sheet, having substantially greater width than thickness, said fastener being composed of a first jaw portion at one end thereof, a substantially rigid lever arm portion adjacent to said first jaw portion, a flexible undulated spring portion adjacent to said lever arm portion and a second lever arm portion adjacent to said spring portion, said lever arm and spring portions having surfaces which project edgewise on to a plane perpendicular to said width, said second lever arm portion being connected by a spring leg to a second jaw portion which has its surfaces principally along the same plane as the first jaw portion, the last-mentioned plane defining a plane of motion of said spring portion and said lever arms, said first-mentioned plane being perpendicular to the plane of motion of said spring portion and said lever arm portions, and a restraining member which limits the motion of said jaw means.

4. A spring clip fastener according to claim 1, wherein said fastener is insertable into a single unitary cover member, said cover member having a thin dimension in the jaw and lever arm region of said fastener, said dimension being in the plane of motion.

5. A spring clip formed from a resilient unitary metallic strip having opposite surfaces that define the length and width of the strip, said clip comprising:
   (a) a body portion that includes a pair of spring lever arms, one end of each of said arms being connected by a bight portion; and
   (b) a jaw portion that includes a member connected to the other end of each of said arms;
   (c) said bight portion being U-shaped and defining a plane that is parallel to the opposite surfaces of the portion of said strip that constitutes said bight portion;
   (d) the members of said jaw portion being relatively disposed to provide a scissors-type opening and closing when said bight portion is flexed about an axis perpendicular to the plane thereof;
   (e) each of said lever arms being undulated to define a lever arm plane that is perpendicular to the plane defined by said bight, the opposite surfaces of the portion of said strip that constitutes each of said lever arms being respectively perpendicular to each of said lever arm planes.

6. A spring clip in accordance with claim 5 wherein the opposite surfaces of the portion of said strip that constitutes each of said members of said jaw portion are substantially parallel to the plane defined by said bight portion.

7. A spring clip in accordance with claim 5 wherein the undulations of the portion of said strip that constitutes said lever arms are essentially perpendicular to the plane defined by said bight.

References Cited by the Examiner

UNITED STATES PATENTS

| | | | |
|---|---|---|---|
| 411,093 | 9/89 | Coughlin | 339—262 |
| 783,061 | 2/05 | Mills | 339—257 |
| 837,599 | 12/06 | Williams | 339—97 |
| 867,031 | 9/07 | Glading | 24—259 |
| 1,039,279 | 9/12 | Hammond | 339—261 |
| 1,096,699 | 5/14 | Elkin | 339—255 |
| 1,337,377 | 4/20 | Wilson | 132—50 |
| 1,507,215 | 9/24 | Spettigue | 24—259 |
| 1,543,524 | 6/25 | Sherman | 339—261 |
| 1,638,978 | 8/27 | Bourne et al. | 339—261 |
| 1,688,182 | 10/28 | Fitzgerald | 339—260 |
| 2,519,987 | 8/50 | Wernette | 24—137 |
| 2,534,875 | 12/50 | Miller | 339—59 |
| 2,664,552 | 12/53 | Ericsson et al. | 339—256 |

FOREIGN PATENTS

| | | |
|---|---|---|
| 390,558 | 2/24 | Germany. |
| 808,252 | 7/51 | Germany. |
| 14,660 | 7/94 | Great Britain. |
| 400,731 | 11/33 | Great Britain. |

JOSEPH D. SEERS, *Primary Examiner*.